United States Patent
Galbraith et al.

(10) Patent No.: US 7,245,444 B2
(45) Date of Patent: Jul. 17, 2007

(54) METHOD AND APPARATUS FOR PROVIDING A READ CHANNEL HAVING IMBEDDED CHANNEL SIGNAL ANALYSIS

(75) Inventors: Richard L. Galbraith, Rochester, MN (US); Travis R. Oenning, Rochester, MN (US); Eric J. Tree, Rochester, MN (US); Bruce A. Wilson, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 279 days.

(21) Appl. No.: 11/095,001

(22) Filed: Mar. 31, 2005

(65) Prior Publication Data

US 2006/0221478 A1 Oct. 5, 2006

(51) Int. Cl.
G11B 5/09 (2006.01)
G11B 5/035 (2006.01)

(52) U.S. Cl. .......................................... 360/46; 360/65
(58) Field of Classification Search ..................... None
See application file for complete search history.

(56) References Cited

U.S. PATENT DOCUMENTS

| | | | |
|---|---|---|---|
| 5,903,857 A * | 5/1999 | Behrens et al. ............ 702/190 |
| 6,208,477 B1 | 3/2001 | Cloke et al. | |
| 6,449,110 B1 * | 9/2002 | DeGroat et al. ............ 360/46 |
| 6,476,992 B1 * | 11/2002 | Shimatani ................ 360/46 |
| 6,636,372 B1 * | 10/2003 | Nguyen et al. ............ 360/31 |
| 2003/0028833 A1 | 2/2003 | Coker et al. | |

* cited by examiner

*Primary Examiner*—William Korzuch
*Assistant Examiner*—Daniell L. Negrón
(74) *Attorney, Agent, or Firm*—David W. Lynch; Chambliss, Bahner & Stophel PC

(57) ABSTRACT

A method and apparatus for providing a read channel having imbedded channel signal analysis is disclosed.

The method and apparatus disclosed determines the types of noise present in a read signal and separates different noises out of the read signal. A signal is read from a storage medium and a written signal is removed from the read signal to produce a noise residue signal. The noise residue signal is converted to a power residue signal. The power residue signal is correlated with a Pseudo Random Bit Sequences (PRBS) sequence used to generate the written signal to produce a deconvolved signal. The deconvolved signal is accumulated.

22 Claims, 7 Drawing Sheets

METHOD AND APPARATUS FOR PROVIDING A READ CHANNEL HAVING IMBEDDED CHANNEL SIGNAL ANALYSIS

BACKGROUND OF THE INVENTION

1. Field of the Invention

This invention relates in general to signals processing, and more particularly to a method and apparatus for providing a read channel having imbedded channel signal analysis.

2. Description of Related Art

Recently developed data storage devices, such as magnetic disk drive devices (i.e., hard disk drives), have increased storage capacity and increased data access speed. With these advantages, magnetic disk drive devices have become widely used as auxiliary memory devices for computer systems. More generally, developments in pulse communications related to these improvements in disk drive technology have recently provided increased speed and reliability in a wide range of pulse communications systems.

The primary features of a magnetic disk drive device that affect storage capacity and access speed are the head, the recording medium, the servo mechanism, the signal processing technique used in the read/write channel, and the like. Among these, signal processing techniques utilizing PRML (Partial Response Maximum Likelihood) detection have greatly contributed to the increased storage capacities and high access speeds seen in modem magnetic disk drive devices.

Each read/write head generates or senses electromagnetic fields or magnetic encodings on the magnetic disk as areas of magnetic flux. The presence or absence of flux reversals in the electromagnetic fields represents the data stored on the magnetic disk. A flux reversal is a change in the magnetic flux on contiguous areas of the magnetic disk. The presence or absence of magnetic flux reversals correspond to binary 1's and 0's of a diagnostic input signal.

To "write" data onto a magnetic disk, electronic components receive data from a host device and translate the data into magnetic encodings. The head transfers the magnetic encodings onto a portion of the magnetic disk.

To "read" data from the magnetic disk, the head is positioned adjacent to the portion of the magnetic disk having the desired magnetic encodings. The head senses and transfers the magnetic encodings from the magnetic disk. The electronic components translate the magnetic encodings into the data, which is transferred to the host device. The host device may be a personal computer or other electronic equipment. The electronic components may apply error detection and correction algorithms to ensure accurate storage and retrieval of data from the magnetic disk. To improve data storage densities on disk drives, magneto resistive and inductive read/write heads have been developed with increased sensitivity to sense smaller amplitude magnetic signals and with increased signal discrimination.

The primary function of the disk drive read channel is to reliably recover data from a noise contaminated read back signal. State of the art detection architectures equalize to a fixed length partial response target and then use the Viterbi algorithm for detection. A read channel circuit includes components for initial processing of the analog read signal generated by the read/write head of the device. This processing typically includes automatic gain control (AGC) amplification, filtering, and equalization, as well as analog-to-digital conversion.

Channel customers are always interested in having imbedded solutions for signal measurement, analysis, tuning, and optimization. The read signal always contains some random noise. The read signal, and certain other signals produced by processing the read signal and that also contain noise, are referred to herein as noise-corrupted signals. For example, it is important to understand the noise contributions in a drive environment, the electronic Noise due to electronics in signal path and stationary Noise due to disk properties. In addition, transition jitter noise due to the boundary structure of written magnetic transitions and breathing mode noise due to variations in sharpness of written magnetic transitions may also be present. These are just a few types of noise that may be present in a read signal, but other types of noise may also be present.

To test the performance of a magnetic storage device, built-in test processes have been used. For example, test tracks having known recording patterns of encoded and precoded data values have been recorded on a data storage surface to determine the noise included in the read signal. These patterns are played back and passed to an on-drive error measurement circuit. Thus, an error generator may generate error value samples by calculating a difference between the nominal, expected value of the data sample, and the value of the data sample as read from the storage surface. The results of this test may be used to adjust e.g. write precompensation within the disk drive.

However, A non-embedded solution for noise analysis requires the high-speed acquisition of analog signals (or digital signals if available) and a great deal of off-line processing. Thus, an imbedded signal analysis tool would be very valuable. The high level of hardware integration and high speed & frequencies present in the drive environment could allow channel Parameters to be optimized based on noise analysis including media noise post-processor (MNP) settings and programmable NPML detection targets. Head and disk characterization could also be performed.

It can be seen that there is a need for a method and apparatus for providing a read channel having imbedded channel signal analysis.

SUMMARY OF THE INVENTION

To overcome the limitations in the prior art described above, and to overcome other limitations that will become apparent upon reading and understanding the present specification, the present invention discloses a method and apparatus for providing a read channel having imbedded channel signal analysis.

The present invention solves the above-described problems by determining the types of noise present in a read signal and separate different noises out of the read signal.

An embodiment of the present invention reads a signal from a storage medium and removes a written signal from the read signal to produce a noise residue signal. The noise residue signal is converted to a power residue signal. The power residue signal is correlated with a Pseudo Random Bit Sequences (PRBS) sequence used to generate the written signal to produce a deconvolved signal. The deconvolved signal is accumulated.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing a read channel having imbedded channel signal analysis. The types of noise present in a read signal are determined and the different noises are then capable of being separated out of the read signal.

Figure 1:
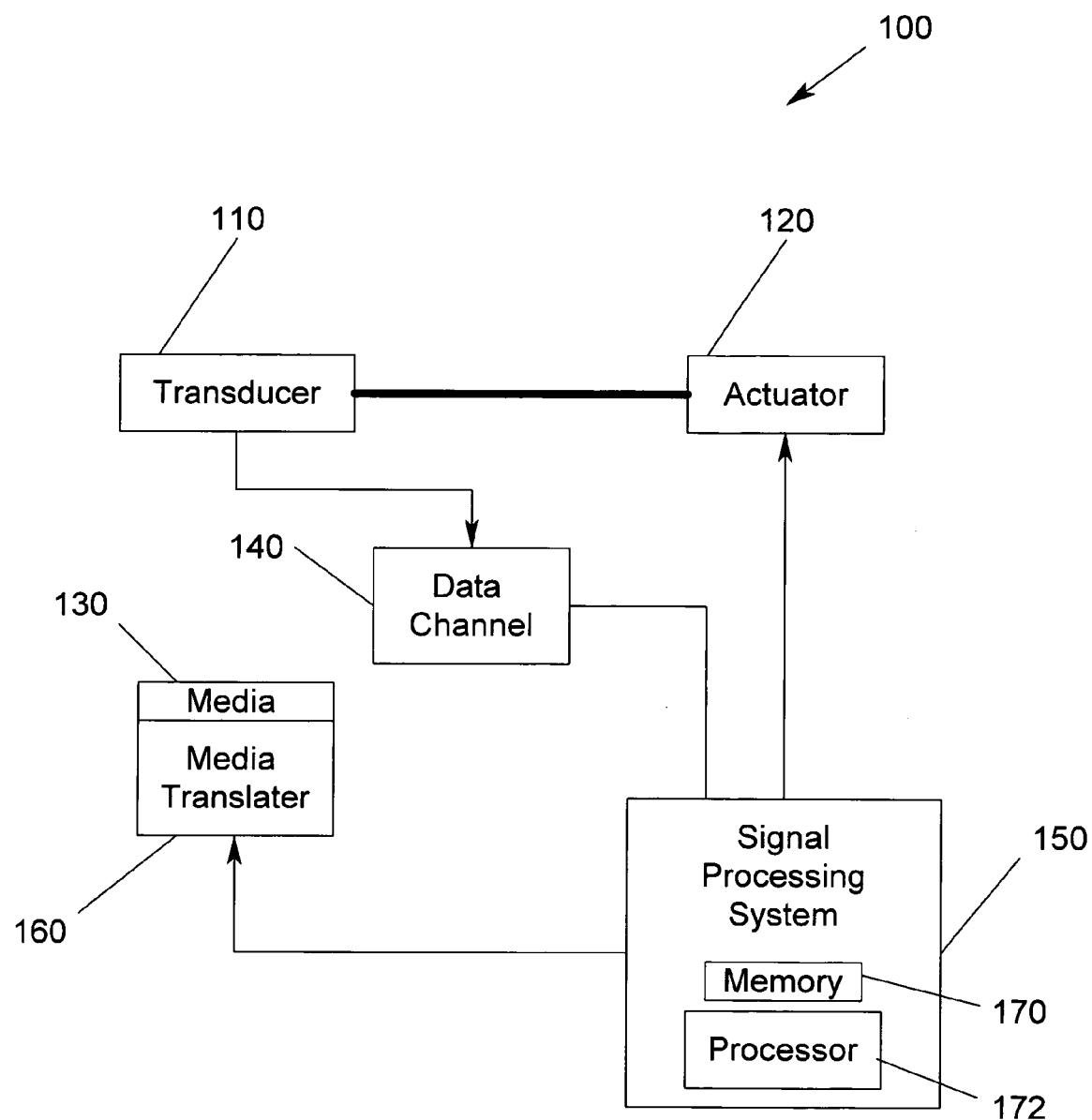
FIG. 1 illustrates a storage system according to an embodiment of the present invention.

FIG. 1 illustrates a storage system 100 according to an embodiment of the present invention. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor system 150 controls the actuator 120 and processes the signals of the data channel 140. In addition, a media translator 160 is controlled by the signal processor system 150 to cause the magnetic media 130 to move relative to the transducer 110. Nevertheless, the present invention is not meant to be limited to a particular type of storage system 100 or to the type of media 130 used in the storage system 100.

Figure 2:
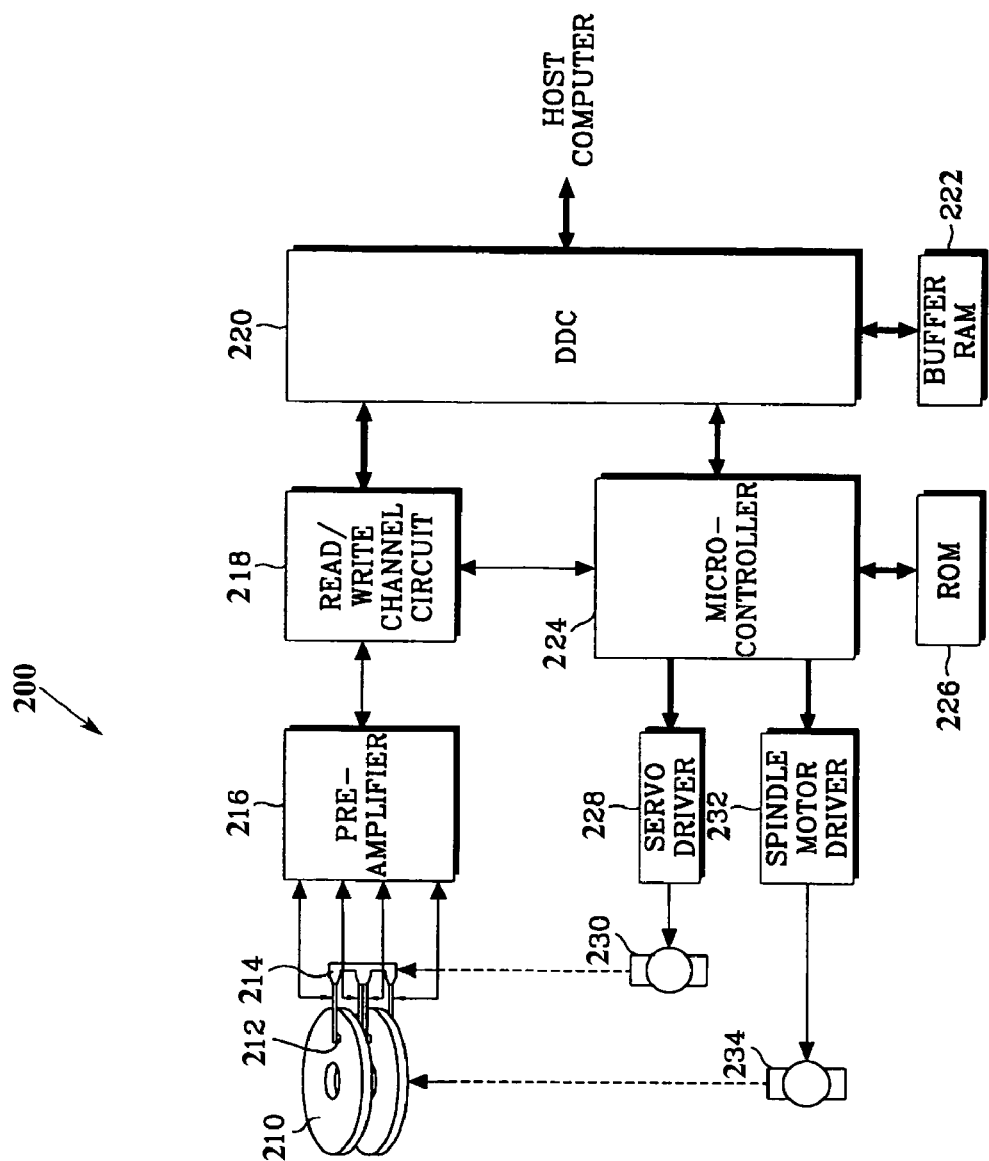
FIG. 2 is a block diagram of a magnetic disk drive device according to an embodiment of the present invention.

FIG. 2 is a block diagram of a magnetic disk drive device 200 according to an embodiment of the present invention. In FIG. 2, disks 210 are rotated by a spindle motor 234, and heads 212 are positioned at surfaces of disks 210. Heads 212 are mounted on corresponding servo arms that extend from an E-shaped block assembly 214 to disks 210. Block assembly 214 has an associated rotary voice coil actuator 230 that moves block assembly 214 and thereby changes to positions of heads 212 for reading data from or writing data to a specified position on one or more disks 210.

A pre-amplifier 216 pre-amplifies a signal picked up by heads 212 and thereby provides read/write channel circuit 218 with an amplified signal during a reading operation. During a write operation, pre-amplifier 216 transfers an encoded write data signal from the read/write channel circuit 218 to heads 212. In a read operation, read/write channel circuit 218 detects a data pulse from a read signal provided by pre-amplifier 216 and decodes the data pulse. Read/write channel circuit 218 transfers the decoded data pulse to a disk data controller (DDC) 220. Furthermore, read/write channel circuit 218 also decodes write data received from the DDC 220 and provides the decoded data to pre-amplifier 216.

DDC 220 both writes data received from a host computer (not shown) onto disks 210, through read/write channel circuit 218 and pre-amplifier 216, and transfers read data from disks 210 to the host computer. DDC 220 also interfaces between the host computer and a microcontroller 224. A buffer RAM (Random Access Memory) 222 temporarily stores data transferred between DDC 220 and the host computer, microcontroller 224, and read/write channel circuit 218. Microcontroller 224 controls track seeking and track following functions in response to read and write commands from the host computer.

A ROM (Read Only Memory) 226 stores a control program for microcontroller 224 as well as various setting values. A servo driver 228 generates a driving current for driving actuator 230 in response to a control signal, generated from microcontroller 224 that provides control of the position of heads 212. The driving current is applied to a voice coil of actuator 230. Actuator 230 positions heads 212 relative to disks 210 in accordance with the direction and amount of the driving current supplied from servo driver 228. A spindle motor driver 232 drives spindle motor 234, which rotates disks 210, in accordance with a control value generated from microcontroller 224 for controlling disks 210.

According to an embodiment of the present invention, the DDC 220 may write a Pseudo Random Bit Sequences (PRBS) sequence and then read the signal. The main signal is cancelled out by a FIR block leaving a noise voltage residue. The noise voltage residue is squared to produce a power residue signal and the power residue signal is deconvolved by correlating the power residue signal with a particular phase of the same PRBS sequence as the write data pattern. Thus, the DDC 220 may determine the types of noise present and separate different noises out of the read signal. This a clear advantage over merely providing direct equalization by modifying tap weights using a pseudo-random bit sequence to deconvolve and sample the read channel response. For example, according to an embodiment of the present invention the DDC 220 may determine the types of noise present so that data dependent noise may be separated from non-data dependent noise and transition jitter noise may be separated from breathing noises present in the read signal.

Figure 3:
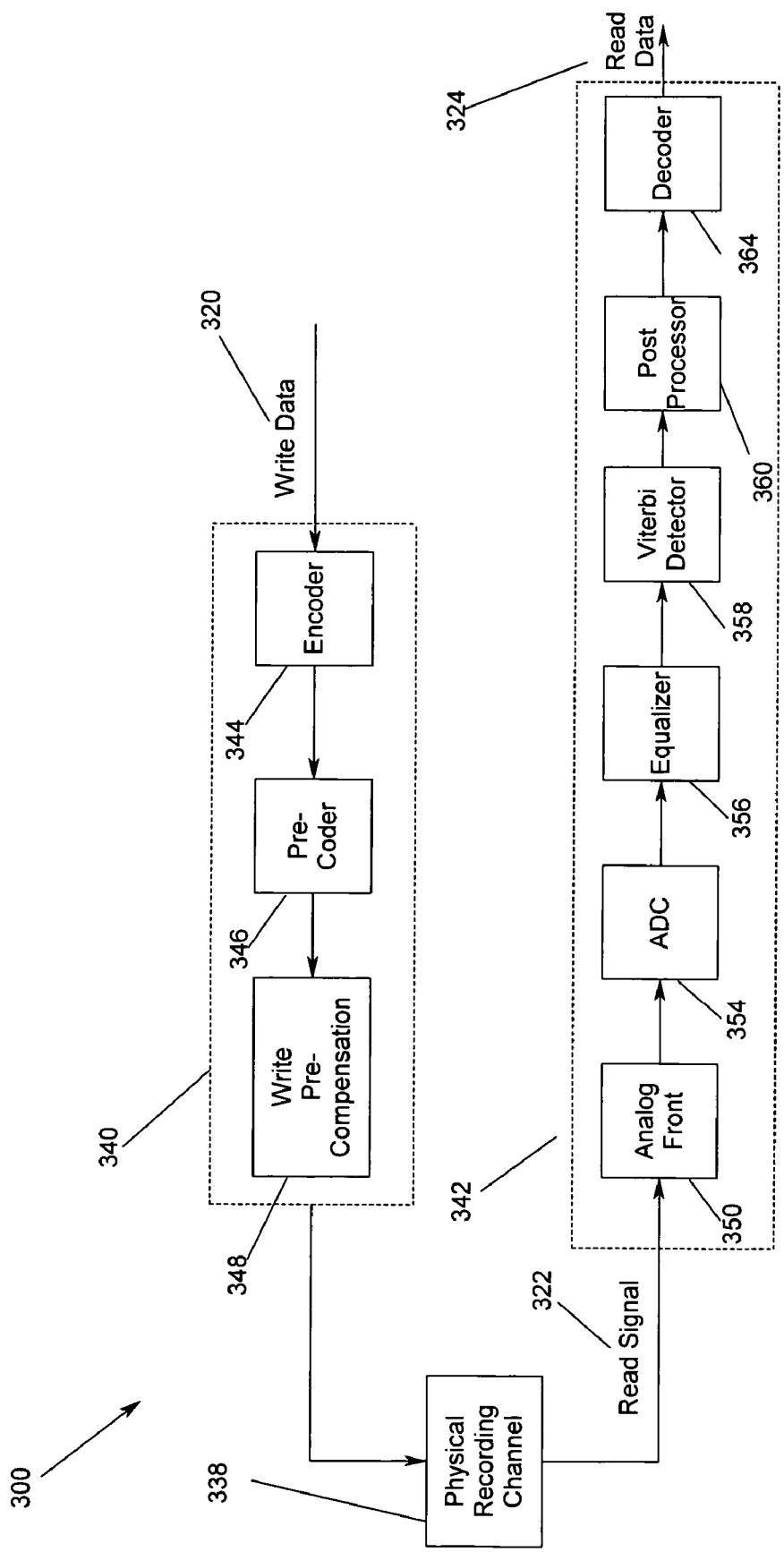
FIG. 3 is a block diagram of a read/write channel circuit of FIG. 2.

FIG. 3 is a block diagram of a read/write channel circuit 300 of FIG. 2. In FIG. 3, the read/write channel circuit 300 includes a physical recording channel 338 having a read/write means and a recording medium, a write channel circuit 340 for writing data onto the recording medium, and a read channel circuit 342 for reading data from the recording medium. Write channel circuit 340 is composed of an encoder 344, a pre-decoder 346, and a write compensator 348. Read channel circuit 342 includes an analog front end 350, an analog-to-digital converter (ADC) 354, an equalizer 356, a Viterbi detector 358, a post-processor 360 and a decoder 364.

In operation, encoder 344 encodes write data 320, input to be written onto the recording medium, into a predetermined code. For example, an RLL (Run Length Limited) code, in which the number of adjacent zeros must remain between specified maximum and minimum values, is commonly used for this predetermined code. However, the present invention is not meant to be limited to RLL and other coding may be used. Pre-decoder 346 is included to prevent error propagation. Write compensator 348 reduces non-linear influences arising from the read/write head. However, because the response of the actual recording channel does not exactly coincide with this transfer function, some subsequent equalization is provided.

Analog front end 350 amplifies an analog signal 322 read from the disk. The signal output from the analog front end 350 is converted into a discrete digital signal by analog-to-digital (A/D) converter 354. The resulting digital signal is then applied to equalizer 356, which adaptively controls inter-symbol interference (ISI) to generate desired waveforms. Viterbi detector 358 receives the equalized signal output from equalizer 356. A post processor 360 may be used to compute an error metric relative to a difference between the sequence of expected sample values that would have been generated in a noiseless system and the actual sample values output by the channel. The post processor 360 evaluates filtered sample errors (noise) to detect and correct errors. Decoder 364 decodes the encoded data output from Viterbi detector 358 to generate the final read data 324.

Figure 4:
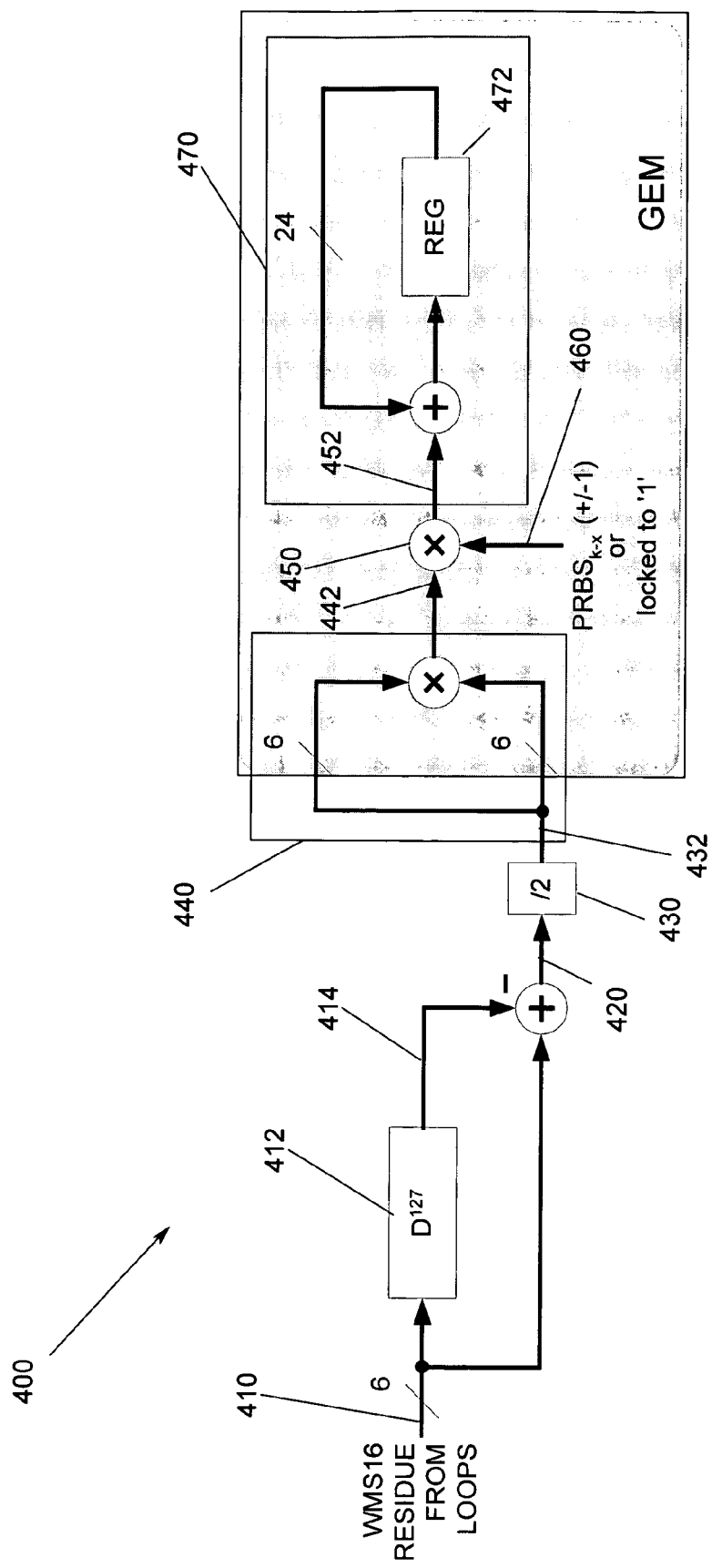
FIG. 4 illustrates a block diagram of an apparatus for providing imbedded channel signal analysis for a read channel according to an embodiment of the present invention.

FIG. 4 illustrates a block diagram 400 of an apparatus for providing imbedded channel signal analysis for a read channel according to an embodiment of the present invention. In FIG. 4, a Pseudo Random Bit Sequences (PRBS) sequence may be used as a write data pattern that is written to a storage medium. For example the PRBS sequence may be a 127-bit sequence. The Pseudo Random Bit Sequences (PRBS) signal provides unique spectral and cyclic properties for the deconvolution process. Many periods of the PRBS pattern are written to the storage medium.

The written data is read and the resulting read signal 410 is provided to a FIR block 412. For example, for a 127-bit PRBS sequence, a 1-D127 filter could be used. The $D^{127}$ in FIR block 412 represents a delay operator of 127 bits in duration. The FIR block 412 could be equalized or un-equalized. The read signal 410 is combined with the output 414 of the FIR block 412 in order to cancel the main signal and leave or extract a noise voltage residue 420. The noise voltage residue 420 is provided to a scaling device 430, e.g., a divider that divides the noise voltage residue 420 by 2, and the scaled version 432 of the noise voltage residue is provided to a squaring circuit 440. The squaring circuit 440 converts the scaled noise voltage residue 432 to a power residue 442. The power residue 442 is deconvolved 450 by correlating it with a particular phase of the same PRBS sequence as the write data pattern 460. 127 deconvolved points are possible. An accumulator 470 receives the deconvolved signal 452. The deconvolution process is performed over an integral number of periods of the sequence.

Figure 5:
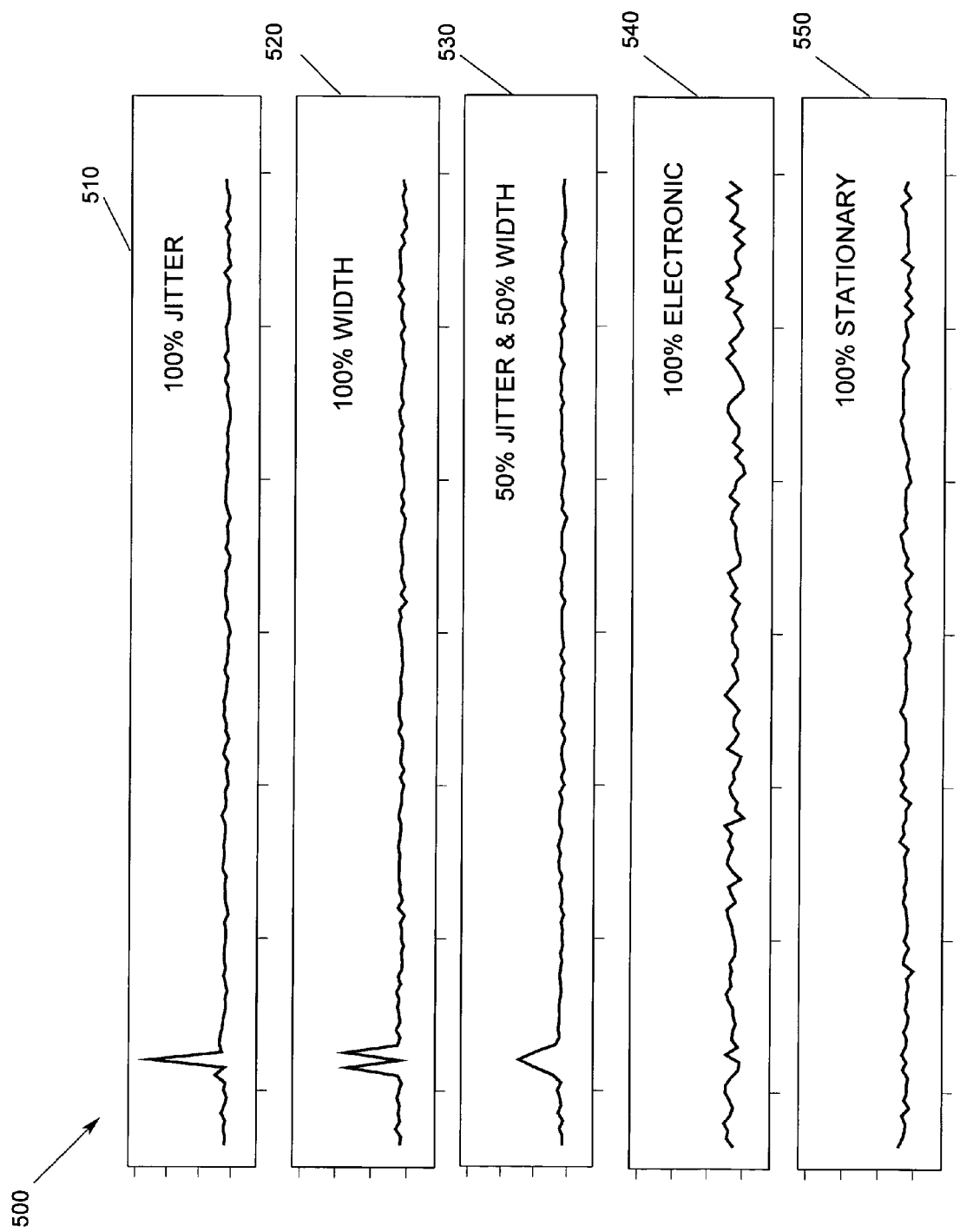
FIG. 5 illustrates examples of deconvolutions according to an embodiment of the present invention.

FIG. 5 illustrates examples of deconvolutions 500 according to an embodiment of the present invention. The imperfect nature of the magnetic thin film results in a imperfect boundary between bit cells instead of an ideal edge, which cause the pulse position to shift in time domain (transition jitter) and pulse-shape to de-form (width variation). The noise introduced by this sort of phenomenon is called transition noise (TN) and it is data dependent in the sense that noise arises only in the presence of transitions that make up a data pattern. In FIG. 5, the first graph 510 illustrates deconvolution for 100% jitter. The second graph 520 illustrates deconvolution for 100% width variation. The third graph 530 illustrates deconvolution for 50% jitter and 50% width. Noise may also result from electronics noise and stationary transition noise. The fourth graph 540 illustrates deconvolution for 100% electronic noise. The fifth graph 550 illustrates deconvolution for 100% stationary noise. Thus, data-dependent media noise can be separated from non-data-dependent noise and transition jitter noise can be separated from breathing mode noise as well other complex data-dependent modes.

Figure 6:
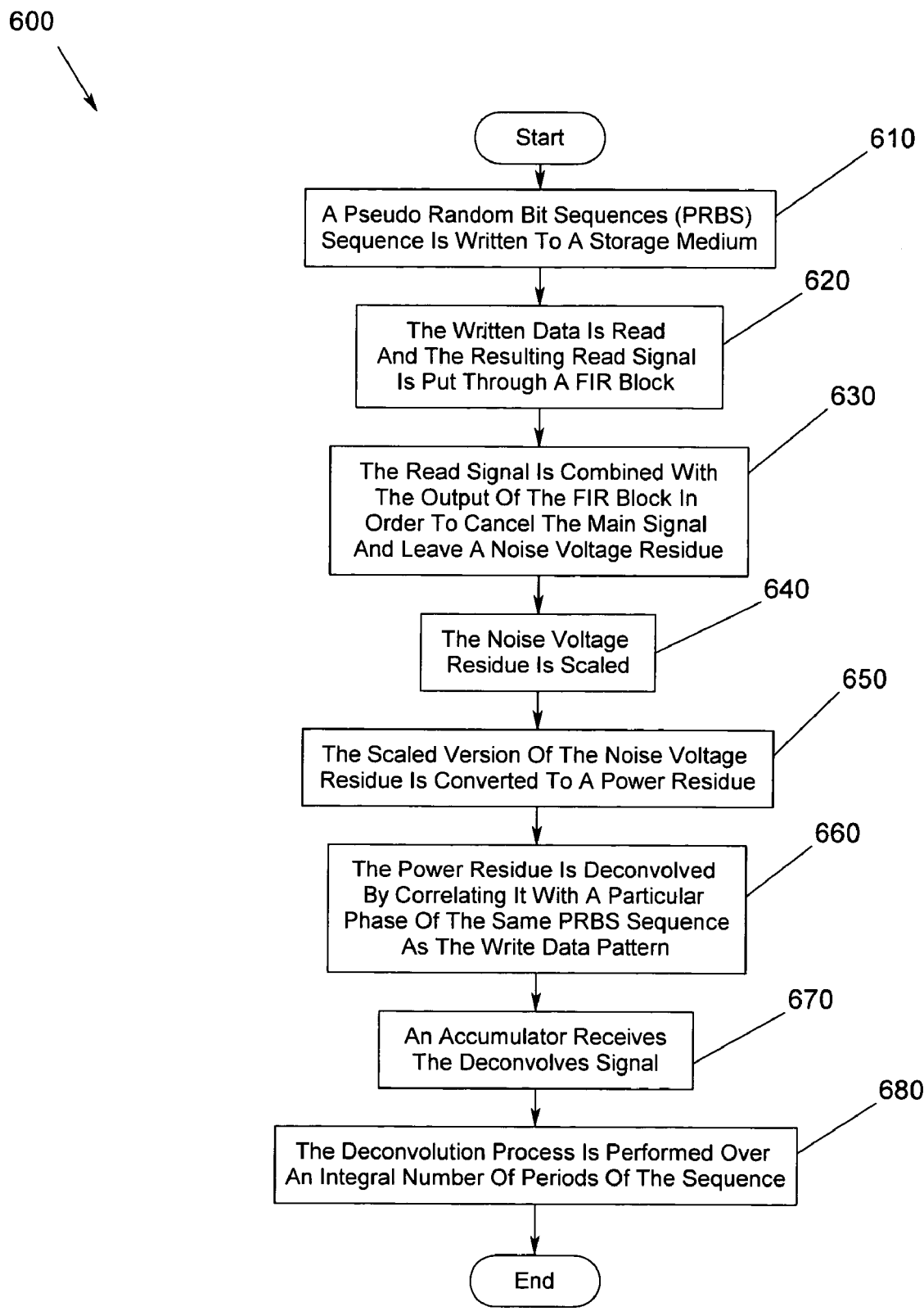
FIG. 6 is a flow chart of the method for performing imbedded channel signal analysis in a read channel according to an embodiment of the present invention.

FIG. 6 is a flow chart 600 of the method for performing imbedded channel signal analysis in a read channel according to an embodiment of the present invention. A Pseudo Random Bit Sequences (PRBS) sequence is written to a storage medium 610. The written data is read and the resulting read signal is put through a FIR block 620. As mentioned above, the FIR block may include a 1-D127 filter. Further, the FIR block could be equalized or un-equalized. The read signal is combined with the output of the FIR block in order to cancel the main signal and leave a noise voltage residue 630. The noise voltage residue is scaled 640, e.g., divided by 2. The scaled version of the noise voltage residue is provided to a squaring circuit 650 to convert the noise voltage residue to a power residue. The power residue is deconvolved by correlating it with a particular phase of the same PRBS sequence as the write data pattern 660. An accumulator receives the deconvolved signal 670. The deconvolution process is performed over an integral number of periods of the sequence 680.

Figure 7:
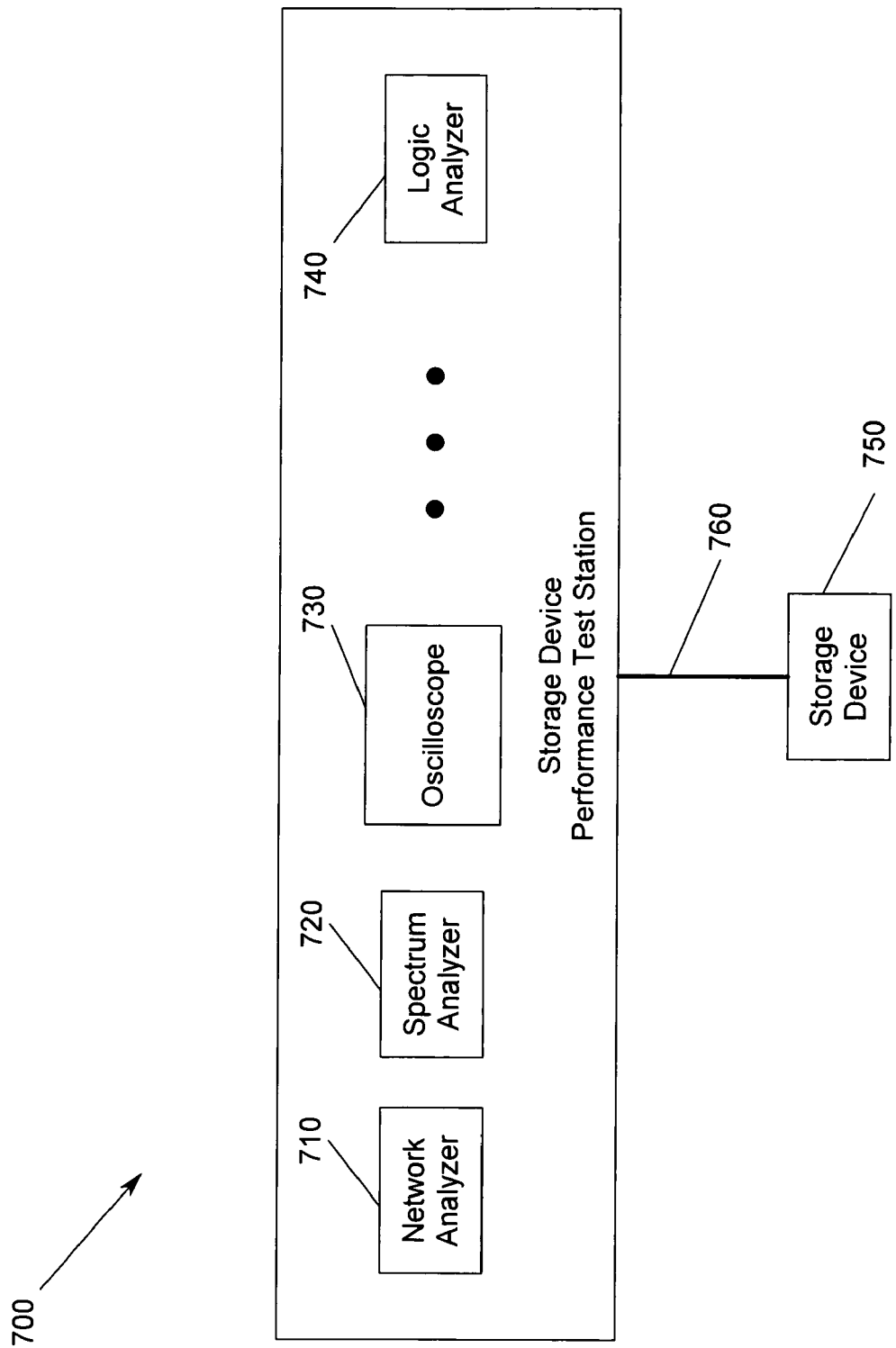
FIG. 7 illustrates a test station for providing feedback during storage device performance testing according to an embodiment of the present invention.

FIG. 7 illustrates a test station for providing feedback during storage device performance testing 700 according to an embodiment of the present invention. In FIG. 7, a storage device performance test station 700 is coupled to a storage device 750 via a bus or communication channel 760. The storage device performance test station 700 is configured for providing a user feedback regarding performance of storage device 750. The storage device performance test station 700 may include a network analyzer 710, a spectrum analyzer 720, an oscilloscope 730, a logic analyzer 740, or any other test or display device. Moreover, the test station 700 may be configured for causing the storage device to perform an imbedded read channel signal analysis according to an embodiment of the present invention. While the test station 700 has been shown to include a network analyzer 710, a spectrum analyzer 720, an oscilloscope 730 and a logic analyzer 740, those skilled in the art will recognize that the present invention is not meant to be limited to a test station 700 as shown. Rather, any test station 700 that provides suitable feedback of the imbedded read channel signal analysis according to the present invention is possible.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A read channel, comprising:
   a noise residue extraction circuit for receiving a read signal and removing a written signal from the read signal to produce a noise residue signal;
   a noise-to-power converter, coupled to the noise residue extraction circuit, for converting the noise residue signal to a power residue signal;
   a deconvolver, coupled to the noise-to-power converter, for correlating the power residue signal with a Pseudo Random Bit Sequences (PRBS) sequence used to generate the written signal to produce a deconvolved signal; and an accumulator, coupled to the deconvolver, for accumulating the deconvolved signal.

2. The read channel of claim 1, wherein the noise residue extraction circuit further comprises a FIR block for producing a filtered signal representing the written data and a mixer for subtracting the filtered signal from the read signal to produce the noise residue signal.

3. The read channel of claim 2, wherein the FIR block comprises a 1-D127 filter.

4. The read channel of claim 1 further comprises a scaling circuit for scaling the noise residue signal.

5. The read channel of claim 4, wherein the scaling circuit comprises a divider circuit.

6. The read channel of claim 1, wherein the noise-to-power converter comprises a splitter for creating two noise residue signals and a multiplier for multiplying the two noise residue signals to produce the power residue signal.

7. The read channel of claim 1, wherein the deconvolver further comprises a mixer for receiving the power residue signal and the Pseudo Random Bit Sequences (PRBS) sequence, the mixer correlating the power residue signal with the Pseudo Random Bit Sequences (PRBS) sequence to produce the deconvolved signal.

8. The read channel of claim 1, wherein the accumulator comprises an adder and a register, wherein the adder adds the contents of the register to the incoming deconvolved signal and providing the resulting summed signal to the mixer.

9. The read channel of claim 1, wherein the deconvolver deconvolves the power residue signal over an integral number of periods of the Pseudo Random Bit Sequences (PRBS) sequence.

10. A read channel, comprising:
memory for storing data therein; and
a processor, coupled to the memory, the processor being configured for performing signal analysis for the read channel, the processor further being configured for receiving a read signal and removing a written signal from the read signal to produce a noise residue signal, for converting the noise residue signal to a power residue signal, for correlating the power residue signal with a Pseudo Random Bit Sequences (PRBS) sequence used to generate the written signal to produce a deconvolved signal and an accumulator, coupled to the deconvolver, for accumulating the deconvolved signal.

11. The read channel of claim 10, wherein the processor is configured to provide a FIR block for producing a filtered signal representing the written data, the processor subtracting the filtered signal from the read signal to produce the noise residue signal.

12. The read channel of claim 11, wherein the processor is configured to provide a 1-D127 filter.

13. The read channel of claim 10, wherein the processor is configured to scale the noise residue signal.

14. The read channel of claim 10, wherein the processor is configured to square the noise residue signal to produce the power residue signal.

15. The read channel of claim 10, wherein the processor is configured to mix the power residue signal and the Pseudo Random Bit Sequences (PRBS) sequence to correlate the power residue signal with the Pseudo Random Bit Sequences (PRBS) sequence thereby producing the deconvolved signal.

16. The read channel of claim 10, wherein the processor is configured to store add a stored deconvolved summed signal to a received deconvolved signal.

17. The read channel of claim 10, wherein the processor is configured to deconvolve the power residue signal over an integral number of periods of the Pseudo Random Bit Sequences (PRBS) sequence.

18. A method for performing signal analysis for the read channel, comprising:
reading a signal from a storage medium;
removing a written signal from the read signal to produce a noise residue signal;
converting the noise residue signal to a power residue signal;
correlating the power residue signal with a Pseudo Random Bit Sequences (PRBS) sequence used to generate the written signal to produce a deconvolved signal; and
accumulating the deconvolved signal.

19. A magnetic storage device, comprising:
a magnetic storage medium for recording data thereon;
a motor for moving the magnetic storage medium;
a head for reading and writing data on the magnetic storage medium;
an actuator for positioning the head relative to the magnetic storage medium; and
a hard disk controller implementing a read channel for processing signals read from the magnetic storage medium, the hard disk controller further comprising a memory for storing data therein and a processor, coupled to the memory, the processor being configured for performing signal analysis for the read channel, the processor further being configured for receiving a read signal and removing a written signal from the read signal to produce a noise residue signal, for converting the noise residue signal to a power residue signal, for correlating the power residue signal with a Pseudo Random Bit Sequences (PRBS) sequence used to generate the written signal to produce a deconvolved signal and an accumulator, coupled to the deconvolver, for accumulating the deconvolved signal.

20. A read channel, comprising:
means for receiving a read signal and removing a written signal from the read signal to produce a noise residue signal;
means, coupled to the means for receiving a read signal and removing a written signal from the read signal to produce a noise residue signal, for converting the noise residue signal to a power residue signal;
means, coupled to the means for converting, for correlating the power residue signal with a Pseudo Random Bit Sequences (PRBS) sequence used to generate the written signal to produce a deconvolved signal; and
means, coupled to the means for correlating, for accumulating the deconvolved signal.

21. A read channel, comprising:
means for storing data therein; and
means, coupled to the means for storing, for receiving a read signal and removing a written signal from the read signal to produce a noise residue signal, for converting the noise residue signal to a power residue signal, for correlating the power residue signal with a Pseudo Random Bit Sequences (PRBS) sequence used to generate the written signal to produce a deconvolved signal and an accumulator, coupled to the deconvolver, for accumulating the deconvolved signal.

22. A magnetic storage device, comprising:
- means for recording data thereon;
- means for moving the magnetic storage medium;
- means for reading and writing data on the magnetic storage medium;
- means for positioning the head relative to the magnetic storage medium; and
- means for receiving a read signal and removing a written signal from the read signal to produce a noise residue signal, for converting the noise residue signal to a power residue signal, for correlating the power residue signal with a Pseudo Random Bit Sequences (PRBS) sequence used to generate the written signal to produce a deconvolved signal and an accumulator, coupled to the deconvolver, for accumulating the deconvolved signal.

* * * * *